(12) United States Patent
Hong et al.

(10) Patent No.: US 8,178,473 B2
(45) Date of Patent: May 15, 2012

(54) SUPERCONDUCTIVE MAGNET FOR PERSISTENT CURRENT AND METHOD FOR MANUFACTURING THE SAME

(76) Inventors: Gye-Won Hong, Seongnam-si (KR); Hee-Gyoun Lee, Ulwang-si (KR)

( * ) Notice: Subject to any disclaimer, the term of this patent is extended or adjusted under 35 U.S.C. 154(b) by 1166 days.

(21) Appl. No.: 11/994,173

(22) PCT Filed: May 26, 2006

(86) PCT No.: PCT/KR2006/002017
§ 371 (c)(1),
(2), (4) Date: Dec. 28, 2007

(87) PCT Pub. No.: WO2007/004787
PCT Pub. Date: Jan. 11, 2007

(65) Prior Publication Data
US 2008/0207458 A1    Aug. 28, 2008

(30) Foreign Application Priority Data
Jul. 6, 2005    (KR) .......................... 10-2005-0060864

(51) Int. Cl.
*H01L 39/24* (2006.01)
(52) U.S. Cl. ........ 505/430; 505/433; 505/434; 505/705; 505/706; 29/599
(58) Field of Classification Search .................. 505/211, 505/430, 433, 434, 705, 706; 29/599
See application file for complete search history.

(56) References Cited

U.S. PATENT DOCUMENTS

| 3,785,036 | A | * | 1/1974 | Tada et al. ..................... 29/419.1 |
| 6,112,395 | A | * | 9/2000 | Quick et al. .................. 29/419.1 |
| 6,235,402 | B1 | * | 5/2001 | Shoup et al. .................. 428/472 |
| 2003/0173103 | A1 | * | 9/2003 | Morita et al. .............. 174/125.1 |
| 2007/0015666 | A1 | * | 1/2007 | Hans Thieme ................ 505/431 |

FOREIGN PATENT DOCUMENTS

| EP | 0807939 | * | 11/1997 |
| EP | 1276171 A2 | * | 1/2003 |
| JP | 5190326 | * | 7/1993 |

* cited by examiner

*Primary Examiner* — Paul Wartalowicz
(74) *Attorney, Agent, or Firm* — John K. Park; Park Law Firm

(57) ABSTRACT

Disclosed are a superconductive magnet manufactured by winding a thin superconductive rod wire in a coil without joint for maintaining a persistent current mode, and a method for manufacturing the same. The method includes winding both ends of a superconductive rod wire (10) on a first bobbin (21) and a second bobbin (22) respectively; forming a first unit rod wire (10*a*) and a second unit rod wire (10*b*) by slitting the superconductive rod wire (10) in the lengthwise direction; producing a pancake coil by winding the first and second unit rod wires (10*a*, 10*b*) on third bobbins (25) in one direction; and arranging the first and second unit rod wires (10*a*, 10*b*) such that magnetic fields (B, B') in the same direction are generated from the pancake coil, by reversing one of the third bobbins (25) on which the first and second unit rod wires (10*a*, 10*b*) are wound.

2 Claims, 6 Drawing Sheets

[Fig. 1]
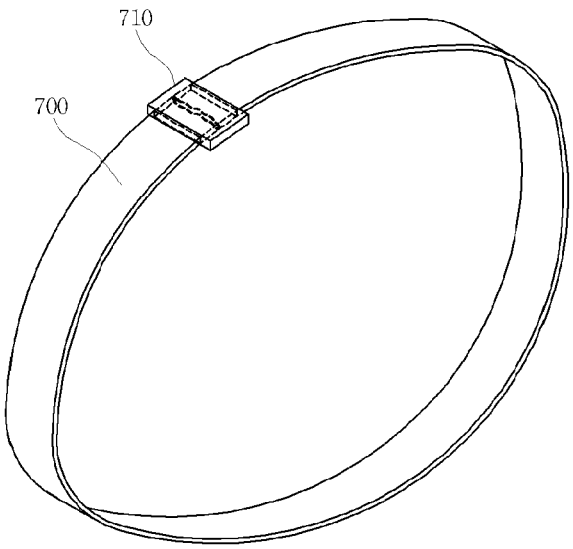
[Fig. 2]
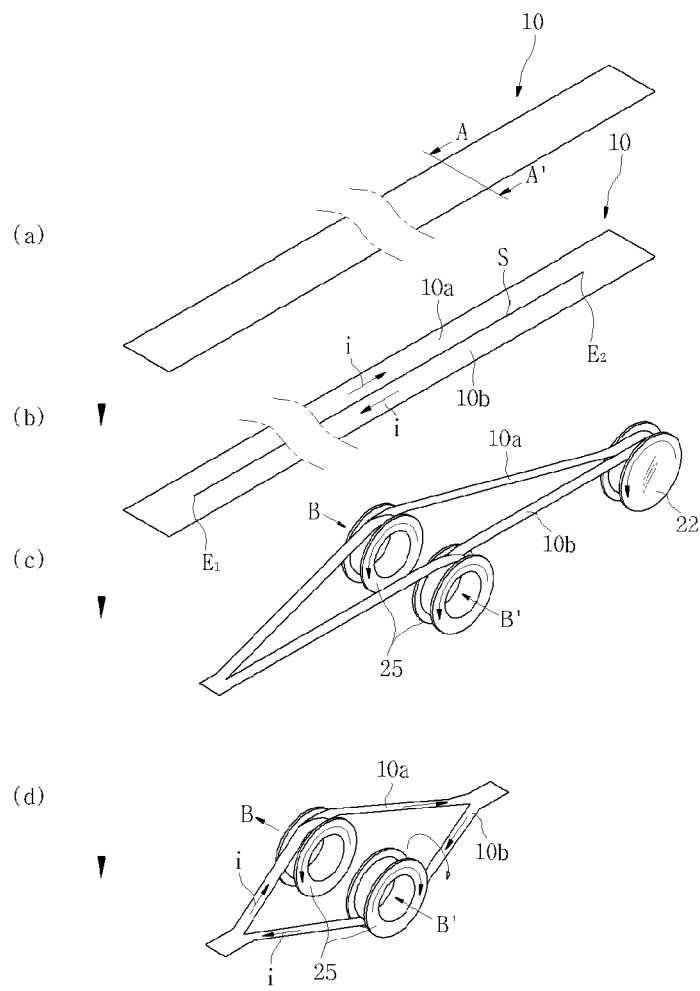

[Fig. 3]
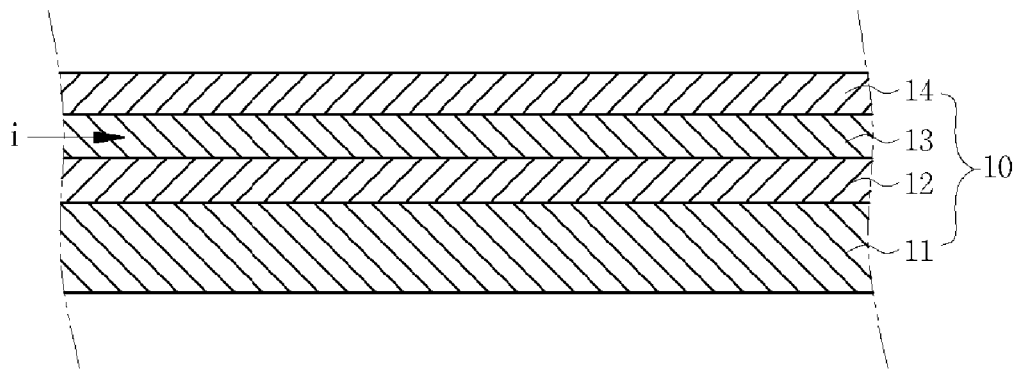
[Fig. 4]
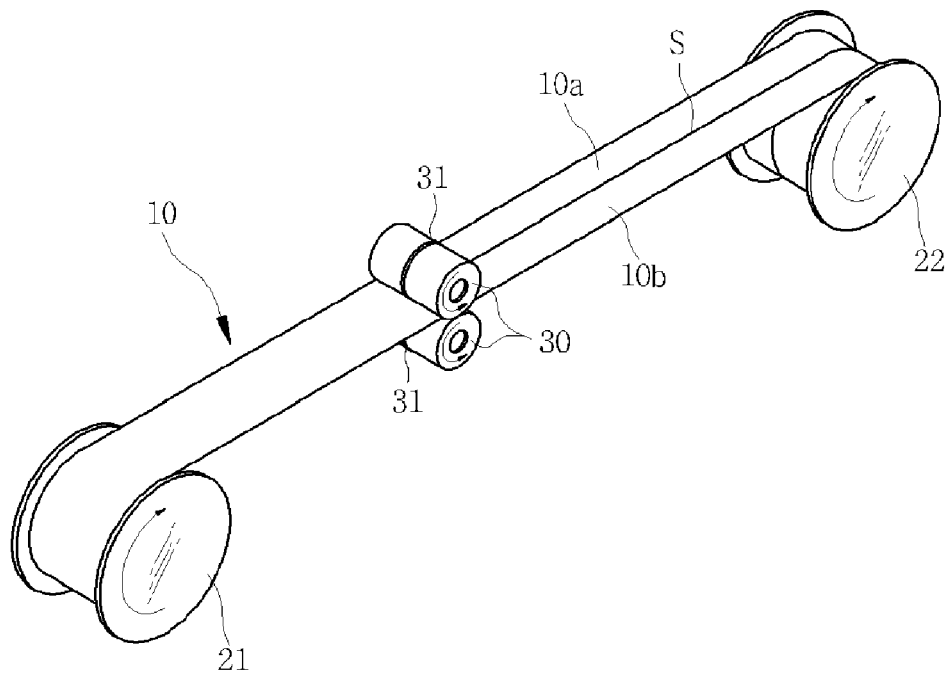

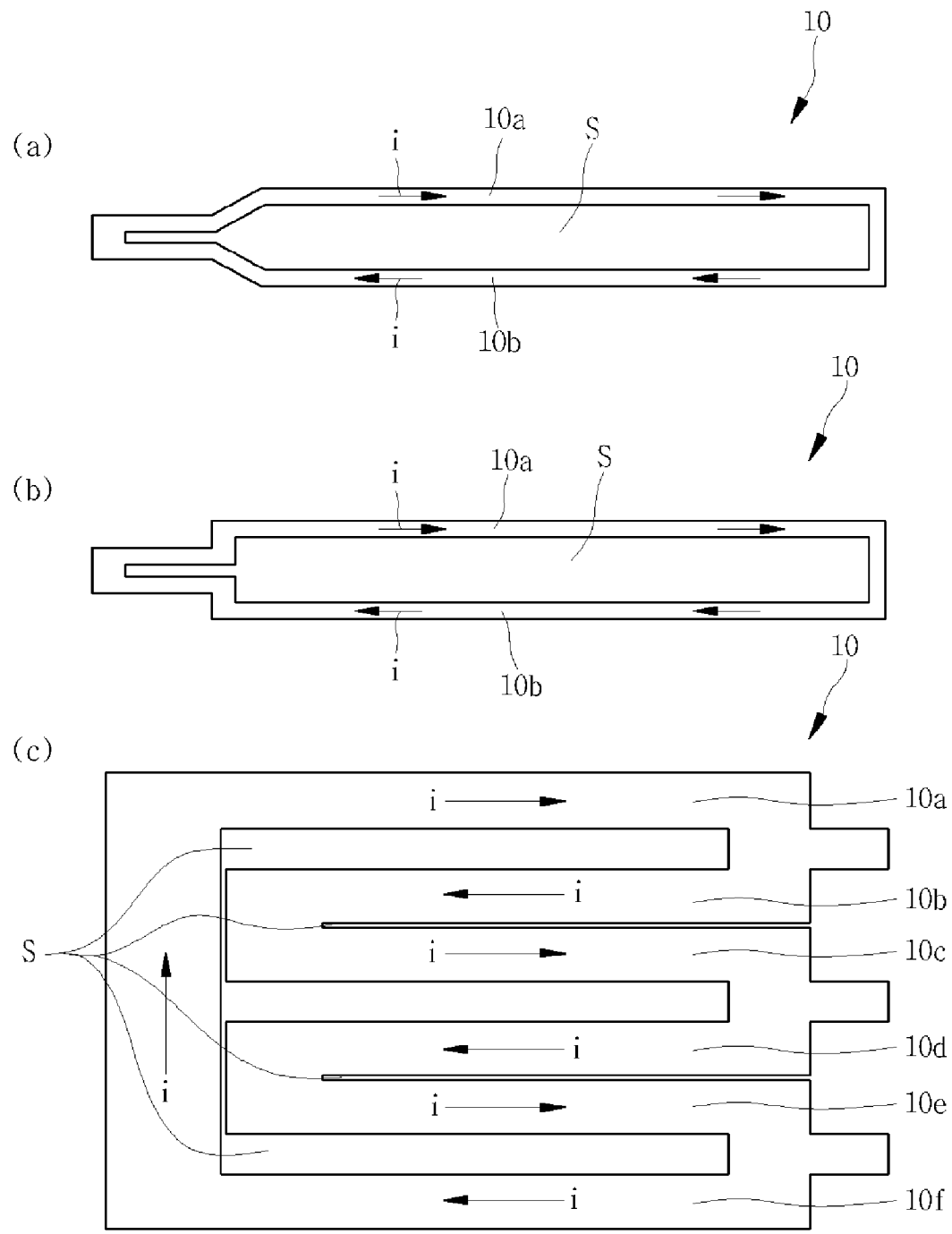

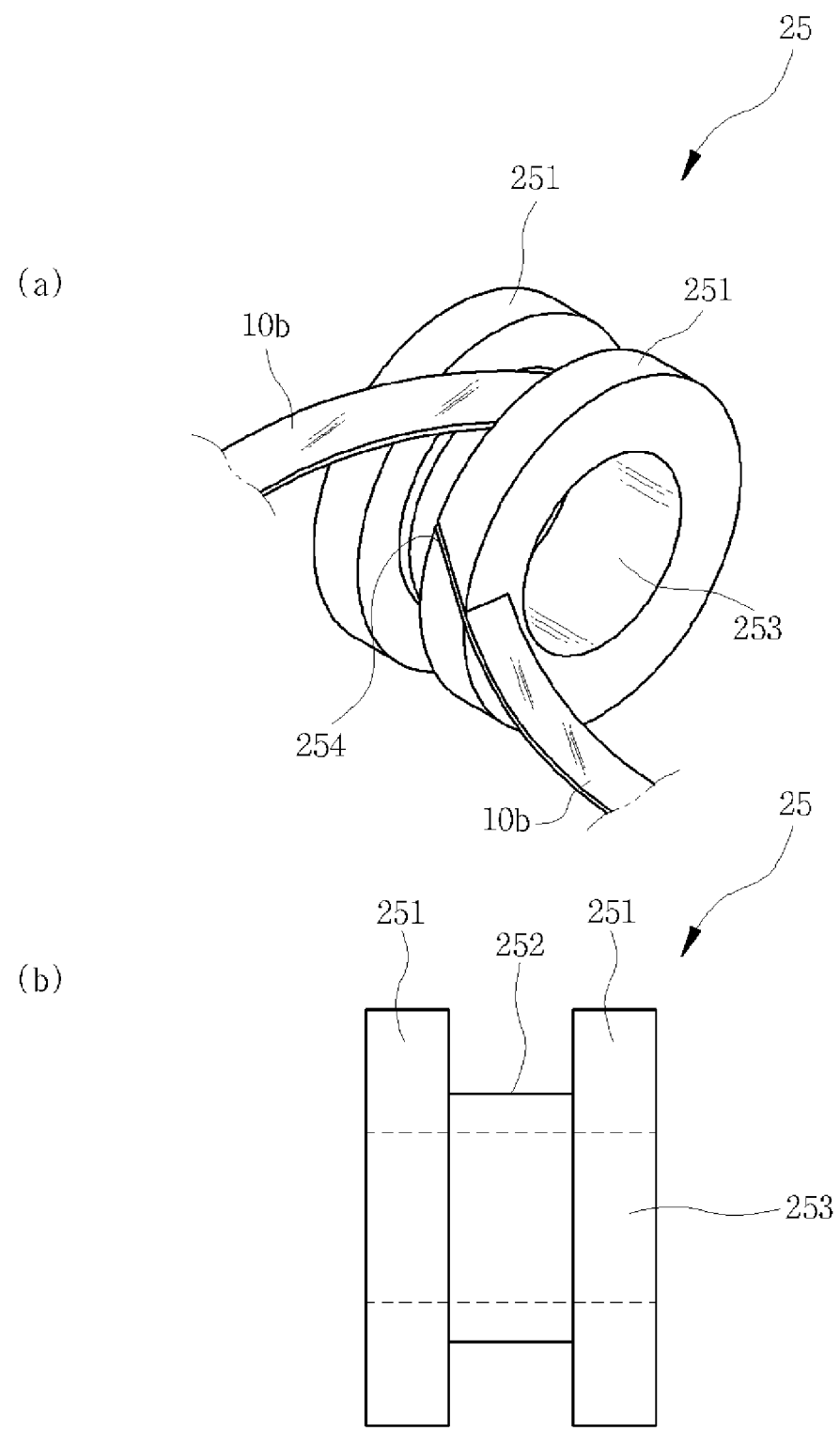
[Fig. 6]

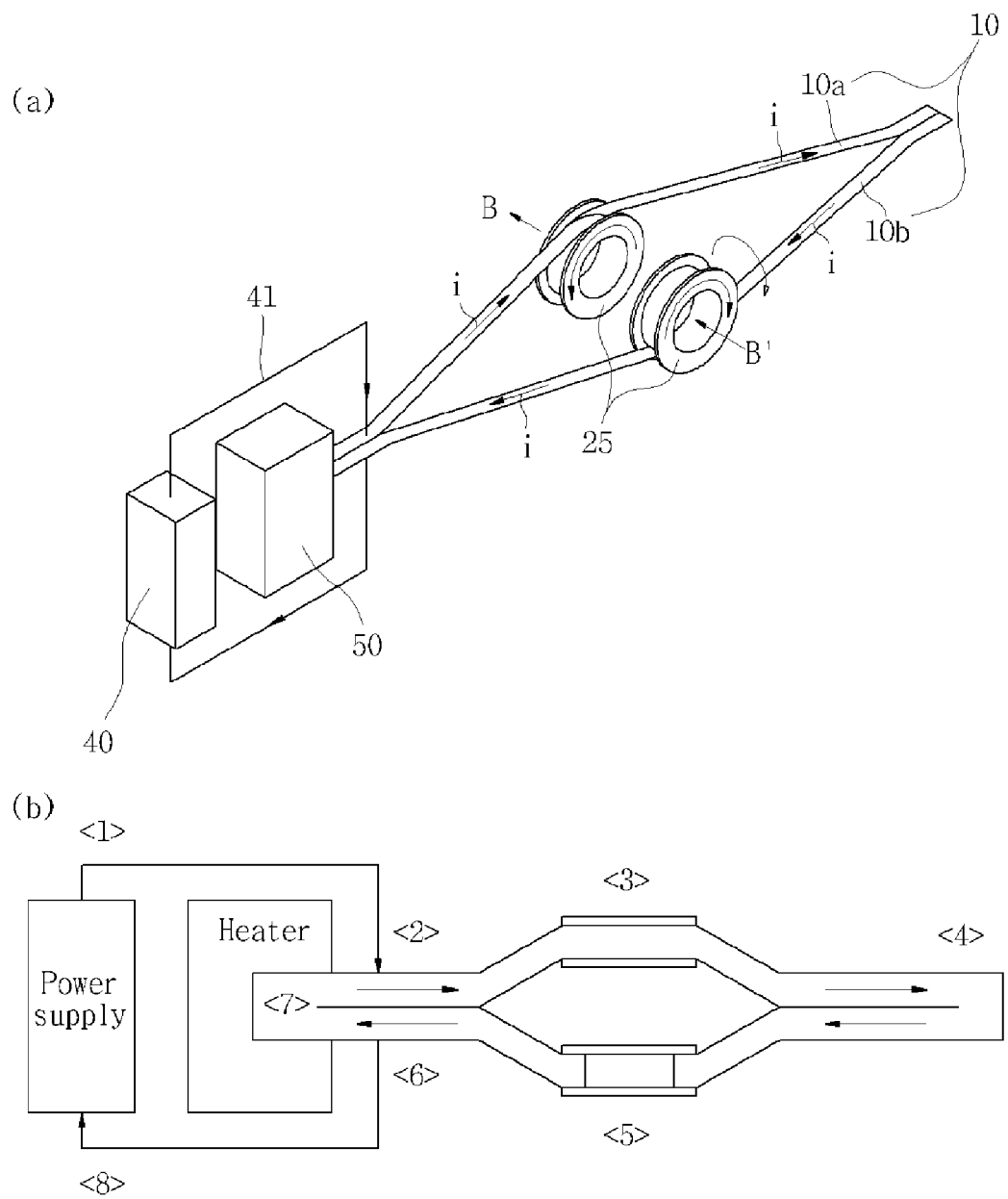

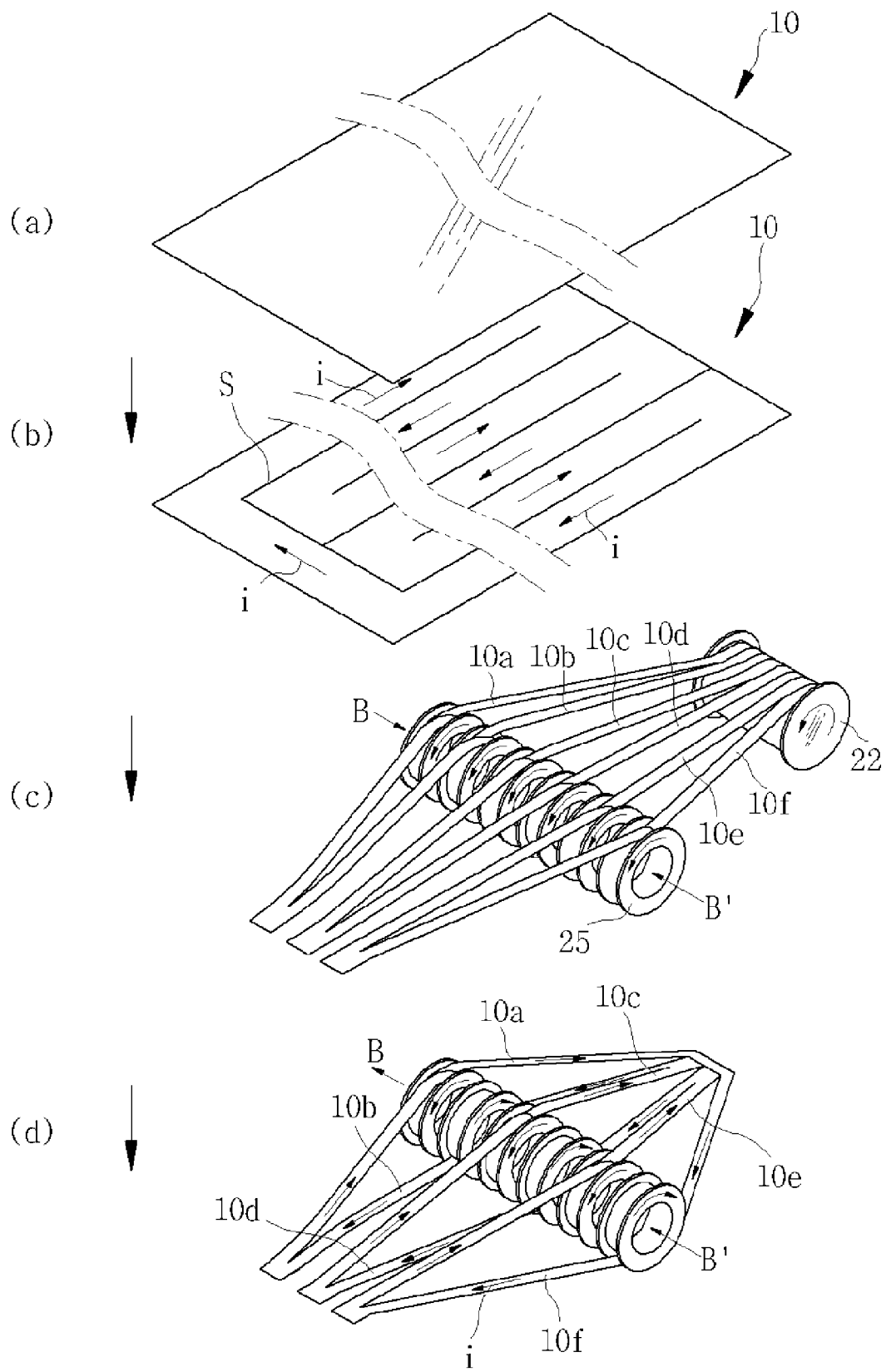

SUPERCONDUCTIVE MAGNET FOR PERSISTENT CURRENT AND METHOD FOR MANUFACTURING THE SAME

TECHNICAL FIELD

The present invention relates to a superconductive magnet for persistent current, and more particularly to a superconductive magnet manufactured by winding up a thin high-temperature superconductive rod wire in a coil without joint for maintaining a persistent current mode, and a method for manufacturing the same.

BACKGROUND ART

Superconductivity denotes a phenomenon in which resistance of a substance disappears when the temperature of the substance is lowered. When a substance having superconductivity is used, electric current flows in the substance without generating heat, and thus a loss of the current is not generated. This substance is referred to as a superconductor. The superconductor can pass current without resistance only in a condition of less than a transition temperature (Tc) and a critical magnetic field (Hc). Here, the maximum density of current, which the superconductor passes without resistance, is referred to as a critical current density (Jc).

A superconductive magnet, which generates a magnetic field having a high intensity, is made of the superconductor processed in a linear or tape shape. The superconductive magnet is manufactured by winding up a rod wire in various geometric coil shapes. When current flows along the rod wire, a magnetic field is generated from the coil. In case that the rod wire is made of a superconductor, a loss of the current due to resistance is not generated.

The superconductive magnet is used in spectroscopes, such as a Magnetic Resonance Imaging (MRI) and a Nuclear Magnetic Resonance (NMR). In order to exhibit regulated characteristics, the spectroscope requires a constant and stable state of the magnetic field. For the reason, superconducting joint between both ends of the superconductive magnet wound up in a coil is formed to create a closed circuit in a persistent current mode. When the proper superconducting joint is formed, current flows along the joint portion and other portions of the superconductive magnet without a loss of energy due to electrical resistance, and a magnetic field generated from the superconductive magnet is constantly maintained, thereby allowing the superconductive magnet to enter a persistent current mode in which a desired magnetic field is constantly and stabled maintained.

In U.S. Pat. No. 6,531,233 and Korean Patent Laid-open Publication No. 2001-0086623, as shown in FIG. 1, a magnetic rod wire 700 wound up in a coil and made of metal is prepared, and both ends of the magnetic rod wire 700 are mechanically joined by pressing or using a connection member 710. Further, in Korean Patent Laid-open Publication No. 1991-015512, ceramic high-temperature superconductive elements are heated to a temperature of 750~875 degrees celsius by fuel gas or oxygen flame, and a rod, which is made of the same material as the superconductive elements and is prepared at one end of the elements, is heated, thereby allowing both ends of the elements to be joined.

In case that a superconductive rod wire coil is made of an oxide-grouped high-temperature superconductor, differently from a metallic high-temperature superconductor, since the superconductor has high brittleness, the superconducting joint cannot be achieved by butt joining, in which the superconductors contact each other and are then joined by applying pressure. When the same pressure as that, which is applied to the metallic high-temperature superconductor, is applied to the oxide-grouped high-temperature superconductor, the pressure destroys superconductive crystal grains so that supercurrent flowing in the oxide-grouped high-temperature superconductor is limited.

Further, in order to achieve superconducting joint suitable for a superconductive magnet used in the MRI and NMR, the entire portions or a joint portion of a superconductive magnet coil must be thermally treated at a high temperature. When only the joint portion of the superconductive magnet coil is thermally treated, a difference of characteristics between the thermally treated portion and other portions of the superconductive magnet coil may occur.

DISCLOSURE OF INVENTION

Technical Problem

Therefore, the present invention has been made in view of the above problems, and it is an object of the present invention to provide a high-temperature superconductive rod wire manufactured without joint and a method for manufacturing a superconductive magnet in a persistent current mode using the superconductive rod wire.

Technical Solution

In accordance with an aspect of the present invention, the above and other objects can be accomplished by the provision of a superconductive magnet for persistent current having a superconductive rod wire, the superconductive rod wire being slit in the lengthwise direction and comprising a base metal made of nickel (Ni) or steel use stainless (SUS); an insulating ceramic deposited on or applied to the surface of the base metal, and causing biaxial orientation for preventing a reaction between the base metal and a superconductor thin film during thermal treatment for manufacturing the superconductive rod wire; the superconductor thin film deposited on or applied to the surface of the insulating ceramic and serving as a transfer channel of current; and a metal film deposited on or applied to the surface of the superconductor thin film, made of silver and copper, and serving as a protection layer.

In accordance with another aspect of the present invention, there is provided a method for manufacturing a superconductive magnet for persistent current comprising winding both ends of a superconductive rod wire having a designated length on a first bobbin and a second bobbin respectively; forming a first unit rod wire and a second unit rod wire by slitting the superconductive rod wire from one point located adjacent to one end to the other point located adjacent to the other end in the lengthwise direction; producing a pancake coil by winding the first and second unit rod wires on third bobbins, respectively provided at middle portions of the first and second unit rod wires, in one direction; and arranging the first and second unit rod wires such that magnetic fields in the same direction are generated from the pancake coil, by reversing one of the third bobbins on which the first and second unit rod wires are wound.

Advantageous Effects

A superconductive magnet for persistent current manufactured using a superconductive rod wire without joint and a method for manufacturing the same of the present invention allow current to flow without a loss so that a magnetic field generated from the superconductive magnet is constantly and stably maintained.

DESCRIPTION OF DRAWINGS

The above and other objects, features and other advantages of the present invention will be more clearly understood from the following detailed description taken in conjunction with the accompanying drawings, in which:

FIG. 1 is a perspective view of a conventional permanent magnet manufactured by mechanical joint;

FIGS. 2A to 2D are perspective views illustrating a process for manufacturing a pancake coil using a superconductive magnet for persistent current of the present invention;

FIG. 3 is a sectional view of a superconductive rod wire, taken along the line A-A' of FIG. 2A, before slitting;

FIG. 4 is a perspective view illustrating a method for slitting the superconductive rod wire of the present invention;

FIGS. 5A to 5C are schematic views illustrating various-shaped examples of the superconductive rod wire slit by the method of FIG. 4;

FIGS. 6A and 6B are enlarged views of a third bobbin of the superconductive magnet for persistent current of the present invention;

FIGS. 7A and 7B are schematic perspective and plane views illustrating an application of the superconductive magnet for persistent current of the present invention; and FIGS. 8A to 8D are perspective views illustrating a process for manufacturing another pancake coil having a plurality of unit rod wires using a superconductive magnet for persistent current of the present invention.

BEST MODE

Now, preferred embodiments of the present invention will be described in detail with reference to the annexed drawings.

FIGS. 2A to 2D are perspective views illustrating a process for manufacturing a pancake coil using a superconductive magnet for persistent current of the present invention, FIG. 3 is a sectional view of a superconductive rod wire, taken along the line A-A' of FIG. 2A, before slitting, FIG. 4 is a perspective view illustrating a method for slitting the superconductive rod wire of the present invention, FIGS. 5A to 5C are schematic views illustrating various-shaped examples of the superconductive rod wire slit by the method of FIG. 4, FIGS. 6A and 6B are enlarged views of a third bobbin of the superconductive magnet for persistent current of the present invention, FIGS. 7A and 7B are schematic perspective and plane views illustrating an application of the superconductive magnet for persistent current of the present invention, and FIGS. 8A to 8D are perspective views illustrating a process for manufacturing another pancake coil having a plurality of unit rod wires using a superconductive magnet for persistent current of the present invention.

As shown in FIGS. 2A and 3, a superconductive rod wire 10 is manufactured by sequentially depositing, electro-depositing, or applying an insulating ceramic 12, a superconductor thin film 13, and a metal film 14 on or to a base metal 11.

The base metal 11 has a thickness of approximately 50~100 μm, and is made of nickel (Ni), nickel alloy, or steel use stainless (SUS). The insulating ceramic 12, which is deposited on or applied to the surface of the base metal 11, has a thickness of less than 1 μm, and serves to prevent a reaction between the base metal 11 and the superconductor thin film 13 during thermal treatment for manufacturing the superconductive rod wire 10 and cause biaxial orientation of the superconductor of the superconductor thin film 13. The superconductor thin film 13, which is deposited on or applied to the surface of the insulating ceramic 12, has thickness of less than 1 μm, and serves as a transfer channel of current (i). The metal film 14, which is deposited on or applied to the surface of the superconductor thin film 13, includes a silver film having a thickness of several μm and a copper film having a thickness of several tens of μm, and serves as a protection layer.

Hereinafter, with reference to FIGS. 2A to 2D, a process for manufacturing a pancake coil will be described.

First, as shown in FIG. 2A, both ends of the superconductive rod wire 10 having a designated length are respectively wound on a first bobbin 21 and a second bobbin 22. In FIGS. 2A and 2B, the first and second bobbins 21 and 22 are omitted.

Then, as shown in FIG. 2B, a central portion of the superconductive rod wire 10, both ends of which are wound on the first and second bobbins 21 and 22, is slit from one point ($E_1$) located at one end to the other point ($E_2$) located at the other end in the lengthwise direction, thereby being divided into a first unit rod wire 10a and a second unit rod wire 10b. Here, since both ends of the superconductive rod wire 10 are not slit, when current (i) is supplied to the superconductive rod wire 10, the current (i) continuously flows in the direction of the arrows of FIG. 2B, along the connected first and second unit for wires 10a and 10b without a loss.

Now, with reference to FIG. 4, the above slitting of the superconductive rod wire 10 will be described in detail.

Both ends of the superconductive rod wire 10 are respectively fixed to the first bobbin 21 and the second bobbin 22 under the condition that the superconductive rod wire 10 is wound on the first bobbin 21. The superconductive rod wire 10, which is wound on the first bobbin 21, is slit into the first unit rod wire 10a and the second unit rod wire 10b by upper and lower rolls 31 of a slitter 30, and is then wound on the second bobbin 22. At this time, as shown in FIG. 4, the first bobbin 21 is rotated in the clockwise direction to unwind the superconductive rod wire 10, the upper and lower rolls 31 of the slitter 30 are rotated in the counterclockwise direction to slit the superconductive rod wire 10 into the first and second unit rod wires 10a and 10b, and the second bobbin 22 is rotated in the clockwise direction to wind the first and second unit rod wires 10a and 10b slit from the superconductive rod wire 10.

In FIG. 2C, third bobbins 25 are respectively located at middle portions of the first and second unit rod wires 10a and 10b, which are wound on the second bobbin 22, and wind the first and second unit rod wires 10a and 10b in one direction, thereby producing a pancake coil. Here, one end of the superconductive rod wire 10, which was fixed to the first bobbin 21, is fixed to a fixing unit (not shown), which is separately prepared, and is thus rotated together with the rotation of the third bobbins 25. The second bobbin 22 is rotated in the counterclockwise direction, and the first and second unit rod wires 10a and 10b are respectively wound on the third bobbins 25. Thereby, magnetic fields (B and B') in opposite directions are generated in the third bobbins 25, on which the first and second unit rod wires 10a and 10b are wound.

In FIG. 2D, one of the third bobbins 25, on which the first and second unit rod wires 10a and 10b are wound, is reversed so that the directions of the magnetic fields (B and B') become equal.

FIGS. 5A to 5C are schematic views illustrating various-shaped examples of the superconductive rod wire 10 manufactured by the slitter 30. The superconductive rod wire 10 may be slit into two unit rod wires 10a and 10b, as shown in FIGS. 5A and 5B. Otherwise, the superconductive rod wire 10 may have a large line width before slitting, and be slit into a plurality of unit rod wires 10a, 10b, 10c, 10d, 10e, and 10f, as shown in FIG. 5C. Thereby, in FIG. 5C, current (i) flows along the plurality of unit rod wires 10a, 10b, 10c, 10d, 10e, and 10f in a closed loop shape. Although the slitting of the superconductive rod wire 10 in FIG. 5C in the widthwise direction is performed using a diamond wheel (not shown), the slitting of the superconductive rod wire 10 may be performed using a laser or a cutting instrument, such as a water jet.

FIGS. 6A and 6B are enlarged views of the third bobbin 25 shown in FIGS. 2C and 2D.

As shown in FIGS. 6A and 6B, the third bobbin 25 comprises a main body 252, two wings 251 integrally formed with right and left sides of the main body 252, a through hole 253 formed through the side surfaces of the main body 252 and the two wings 251, and a groove 254 formed in one wing 251 at a tilt so that the superconductive rod wire 10 is slantingly inserted into the groove 254.

FIGS. 7A and 7B are schematic perspective and plane views illustrating an application of the superconductive magnet for persistent current of the present invention. A superconductive switch is attached to the end of the superconductive rod wire 10 fixed to the first bobbin 21 of FIG. 2D. As shown in FIG. 7A, when the superconductive rod wire 10 is cooled to be less than a transition temperature (Tc), and is then heated by a heater 50 under the condition that a power supply 40 supplies current (i) to the superconductive rod wire 10 through a current supply wire 41, the current (i) flows along the first unit rod wire 10a and the second unit rod wire 10b. Then, when the heater 50 is switched off, the magnetic fields (B and B') of the third bobbins 25 enter a superconductive state and the current (i) flows along the third bobbins 25. Thereby, the superconductive rod wire 10 having the two unit rod wires 10a and 10b forms a closed circuit.

When the power supply 40 is switched off, the superconductive rod wire 10 having the two unit rod wires 10a and 1b does not have a resistance component, and thus enter a persistent current mode. In the persistent current mode, although current (i) is not supplied from the outside to the superconductive rod wire 10, current (i) persistently flows along the superconductive rod wire 10.

With reference to FIG. 7B illustrating the flow of the current (i), when the power supply 40 supplies the current (i) to the superconductive rod wire 10 and the heater 50 heats the superconductive rod wire 10, the current (i) flows in order of <1>-<2>-<3>-<4>-<5>-<6>-<8>. Here, a portion <7> of the superconductive rod wire 10 becomes in a high conductive state in which resistance exists, and other portions <2>, <3>, <4>, <5>, and <6> of the superconductive rod wire 10 become in a superconductive state in which resistance does not exist.

Thereafter, when the heater 50 is switched off, the current flows in order of <2>-<3>-<4>-<5>-<6>-<7>. Here, the portion <7> of the superconductive rod wire 10 becomes in the superconductive state, and the current does not flow along a region from the portion <1> to the portion <2> in the high conductive state and a region from the portion <6> to the portion <8> in the high conductive state, but flows towards the portion <7>, thereby forming a closed superconductive circuit.

As shown FIGS. 7A and 7B, the superconductive magnet in a persistent current mode is used in spectroscopes, such as a Magnetic Resonance Imaging (MRI) and a Nuclear Magnetic Resonance (NMR), or in laboratories for obtaining a strong and stable magnetic field having a constant intensity according to time. Further, the superconductive magnet may be applied to other various purposes, such as a small-sized superconductive antenna.

FIGS. 8A to 8D are perspective views illustrating a process for manufacturing another pancake coil having a plurality of unit rod wires using a superconductive magnet for persistent current of the present invention. By the above process, when the superconductive rod wire 10 is slit into the plurality of unit rod wires 10a, 10b, 10c, 10d, 10e, and 10f in the widthwise direction, persistent current can flow along the unit rod wires 10a, 10b, 10c, 10d, 10e, and 10f without resistance. The process for manufacturing the pancake coil as shown in FIGS. 8A to 8D is the same as the process for manufacturing the pancake coil as shown in FIGS. 2A to 2D.

Further, in order to manufacture a solenoid-type superconductive magnet, two solenoid coils are manufactured by the above-described method and one solenoid coil is reversed.

INDUSTRIAL APPLICABILITY

As apparent from the above description, the present invention provides a superconductive magnet for persistent current manufactured using a superconductive rod wire without joint, in which current flows without a loss so that a magnetic field generated from the superconductive magnet is constantly and stably maintained, and a method for manufacturing the same.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for manufacturing a superconductive magnet for persistent current comprising:
    winding both ends of a superconductive rod wire having a designated length on a first bobbin and a second bobbin respectively;
    forming a first unit rod wire and a second unit rod wire by slitting the superconductive rod wire from one point located adjacent to one end to another point located adjacent to the other end in the lengthwise direction;
    producing a pancake coil by winding the first and second unit rod wires on third and fourth bobbins, respectively provided at middle portions of the first and second unit rod wires, in one direction; and
    arranging the first and second unit rod wires such that magnetic fields in the same direction are generated from the pancake coil, by turning one of the third and fourth bobbins upside down on which the first and second unit rod wires are wound.

2. The method as set forth in claim 1, wherein the slitting of the superconductive rod wire is performed by a slitter having upper and lower rolls provided on upper and lower surfaces of the superconductive rod wire.

* * * * *